United States Patent
Telesz et al.

(10) Patent No.: US 6,615,608 B1
(45) Date of Patent: Sep. 9, 2003

(54) MULTI-FUNCTION RECEIVER

(75) Inventors: John Paul Telesz, East Amherst, NY (US); Edward Douglas Pettitt, Burt, NY (US); Jing Zheng, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/183,231

(22) Filed: Jun. 26, 2002

(51) Int. Cl.[7] .......................... F25B 43/00; F25B 39/04
(52) U.S. Cl. .......................................... 62/474; 62/509
(58) Field of Search .................... 62/114, 115, 467, 62/474, 498, 503, 504, 509, 529

(56) References Cited

U.S. PATENT DOCUMENTS

| | | | | |
|---|---|---|---|---|
| 3,710,586 A | * | 1/1973 | Maudlin ..................... | 62/216 |
| 4,291,548 A | * | 9/1981 | Livesay ...................... | 62/503 |
| 4,756,166 A | | 7/1988 | Tomasov .................... | 62/509 |
| 5,545,860 A | * | 8/1996 | Wilkes et al. ............... | 181/255 |
| 6,209,333 B1 | * | 4/2001 | Bascobert ................... | 62/217 |
| 6,430,947 B2 | * | 8/2002 | Bascobert ................... | 62/133 |
| 6,463,757 B1 | * | 10/2002 | Dickson et al. ............. | 62/503 |

OTHER PUBLICATIONS

Marlene Goldsmith, "$CO_2$ Air Conditioning Systems," Denso, Mar. 4, 2002.

* cited by examiner

Primary Examiner—Denise L. Esquivel
Assistant Examiner—Malik N. Drake
(74) Attorney, Agent, or Firm—Patrick M. Griffin

(57) ABSTRACT

A multi-function receiver attenuates pressure fluctuations of refrigerant flowing from an evaporator to a compressor in an air conditioning system. The receiver includes a body housing having an inlet for receiving the refrigerant from a condenser and an outlet for sending the refrigerant to the compressor. A cap housing covers the body housing. The receiver also includes first and second ports defined within the cap housing. The first port communicates with the evaporator for sending the refrigerant to the evaporator, and the second port communicates with the evaporator for receiving the refrigerant from the evaporator. An internal wall defines an outer and an inner cavity. The outer cavity communicates with the inlet for receiving the refrigerant from the condenser and with the first port for sending the refrigerant to the evaporator. The inner cavity communicates with the second port to receive the refrigerant from the evaporator and to attenuate the pressure fluctuations. The inner cavity also communicates with the outlet for sending the refrigerant to the compressor after the pressure fluctuations have been attenuated.

43 Claims, 5 Drawing Sheets

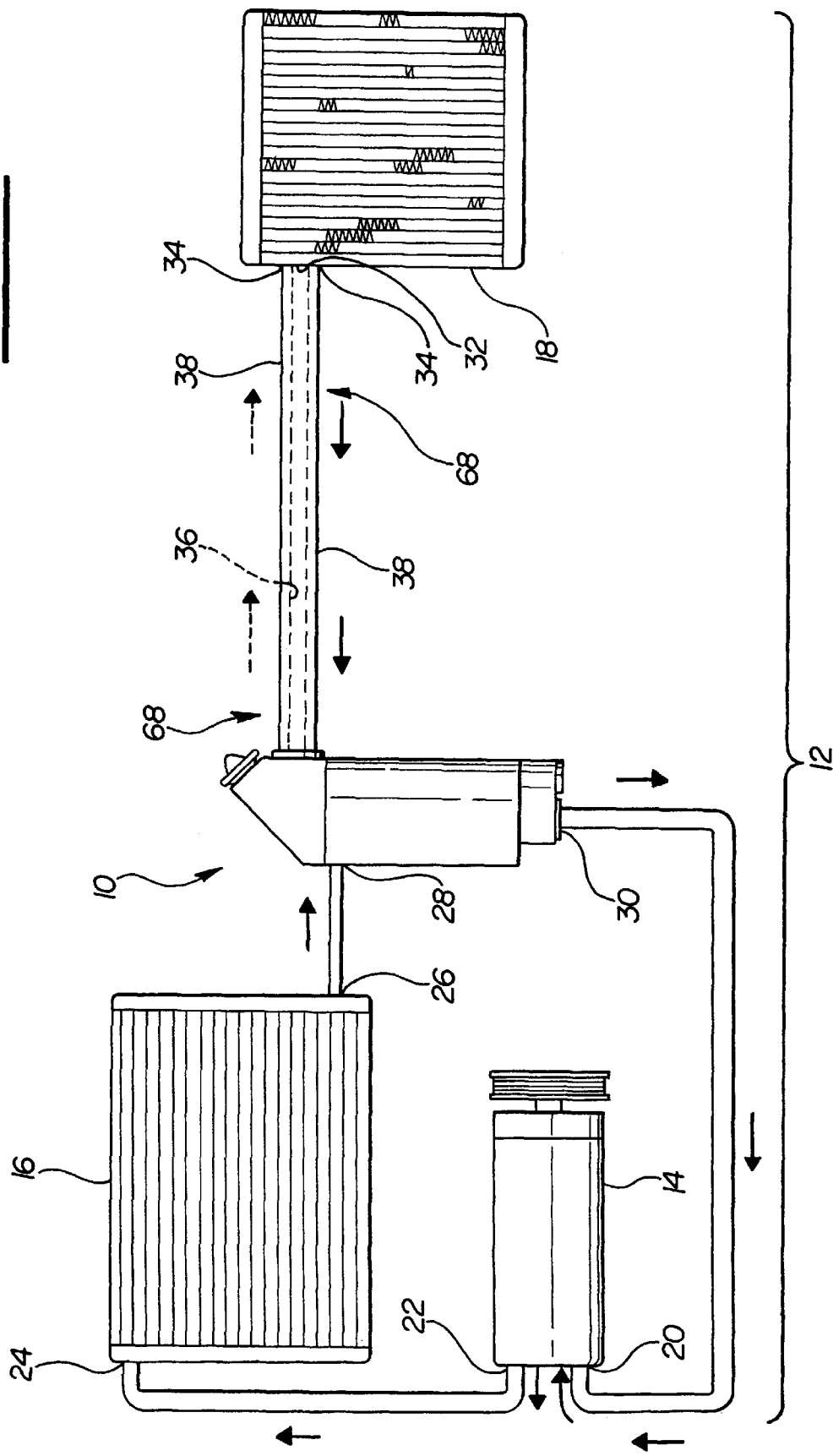

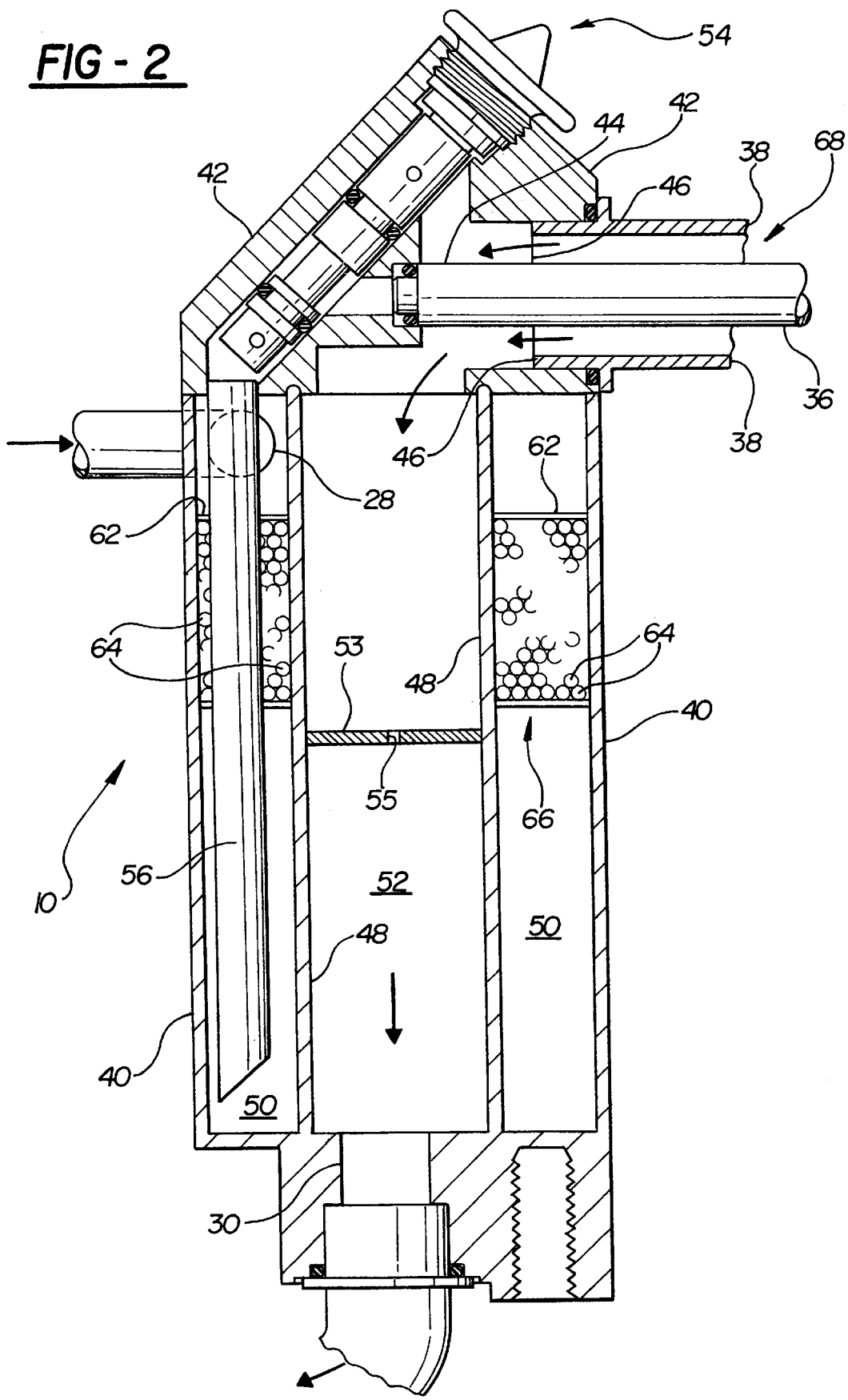

MULTI-FUNCTION RECEIVER

RELATED APPLICATIONS

The subject application is related to commonly-assigned United States patent application entitled "Air Conditioning System and Tubing Apparatus to Prevent Heat Gain due to Engine Compartment Heat" which was filed on the same day as the subject application.

TECHNICAL FIELD

The subject invention generally relates to a multi-functional receiver for use in an air conditioning system of a motor vehicle. More specifically, the subject invention relates to a multi-function receiver that attenuates pressure fluctuations of a refrigerant flowing from an evaporator to a refrigerant compressor in an air conditioning system.

BACKGROUND OF THE INVENTION

A receiver for an air conditioning system of a motor vehicle is known in the art. In fact, receivers have been incorporated into air conditioning systems, which also include refrigerant, a refrigerant compressor, a condenser, an expansion device, such as a thermostatic expansion valve (TXV), and an evaporator, for many years. The receiver serves as a reservoir to store the refrigerant for flow into the expansion device.

A suction line of the air conditioning system extends between the evaporator and the compressor to return the refrigerant from the evaporator, where the refrigerant is essentially a gas, through the suction line and to the compressor for re-circulation.

It is also known in the art that, as the refrigerant flows through the suction line, the refrigerant realizes pressure fluctuations. Unfortunately, these pressure fluctuations increase noise that is present at, or near, the evaporator. Since the evaporator is on a passenger side of a front-of-dash (or 'fire') wall of the vehicle, this noise is particularly noticeable to passengers of the vehicle which, for obvious reasons, is undesirable.

As a result, conventional air conditioning systems incorporate a muffler, commonly referred to as a suction gas muffler, into the suction line between the evaporator and compressor. This muffler is separate from the receiver and therefore adds overall cost and packaging complexity to these air conditioning systems. Furthermore, quality problems associated with this separate muffler, such as refrigerant leaks and reductions in system performance, are also commonplace.

Due to the inadequacies of the prior art, including those described above, it is desirable to provide a receiver that is multi-functional. More specifically, it is desirable to provide a receiver that, in addition to serving as a reservoir for the refrigerant, is able to attenuate pressure fluctuations of the refrigerant flowing from the evaporator to the compressor such that a separate suction gas muffler is no longer required.

SUMMARY OF THE INVENTION

A multi-function receiver for use in an air conditioning system is disclosed. The air conditioning system includes a refrigerant compressor, a condenser in fluid communication with an outlet of the refrigerant compressor, and an evaporator in fluid communication with an outlet of the condenser and with an inlet of the refrigerant compressor. The multi-function receiver of the subject invention attenuates pressure fluctuations of refrigerant flowing from the evaporator to the refrigerant compressor.

More specifically, the multi-function receiver includes a body housing, that includes a receiver inlet and a receiver outlet, and a cap housing that covers the body housing. The receiver inlet receives the refrigerant from the condenser and the receiver outlet sends the refrigerant to the refrigerant compressor.

First and second refrigerant ports are defined within the cap housing. The first refrigerant port is in fluid communication with the evaporator for sending the refrigerant to the evaporator whereas the second refrigerant port is in fluid communication with the evaporator for receiving the refrigerant from the evaporator.

An internal wall of the multi-function receiver defines an outer cavity and an inner cavity. The outer cavity is in fluid communication with the receiver inlet. As such, the outer cavity receives the refrigerant from the condenser. The outer cavity is also in fluid communication with the first refrigerant port for sending the refrigerant to the evaporator. The inner cavity is in fluid communication with the second refrigerant port. As such, the inner cavity receives the refrigerant from the evaporator and attenuates the pressure fluctuations of the refrigerant that is received from the evaporator. The inner cavity is also in fluid communication with the receiver outlet for sending the refrigerant to the compressor after the pressure fluctuations have been attenuated.

Accordingly, the subject invention provides for the elimination of a separate suction gas muffler by introducing a receiver that is multi-functional. With the inner cavity, the multi-function receiver of the subject invention is able to attenuate pressure fluctuations of the refrigerant flowing from the evaporator to the compressor.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is a schematic view of an air conditioning system illustrating a refrigerant compressor, a condenser, a multi-function receiver, an evaporator, and a concentric tubing apparatus extending between the multi-function receiver and the evaporator;

FIG. 2 is a partially cross-sectional side view of the multi-function receiver illustrated in FIG. 1A having concentric first and second refrigerant ports and a cartridge-type TXV;

DESCRIPTION OF THE PREFERRED EMBODIMENT

Referring to the Figures, wherein like numerals indicate like or corresponding parts throughout the several views, a multi-function receiver is generally disclosed at 10. For descriptive purposes only, the multi-function receiver 10 is hereinafter referred to as "the receiver".

Figure 1B:
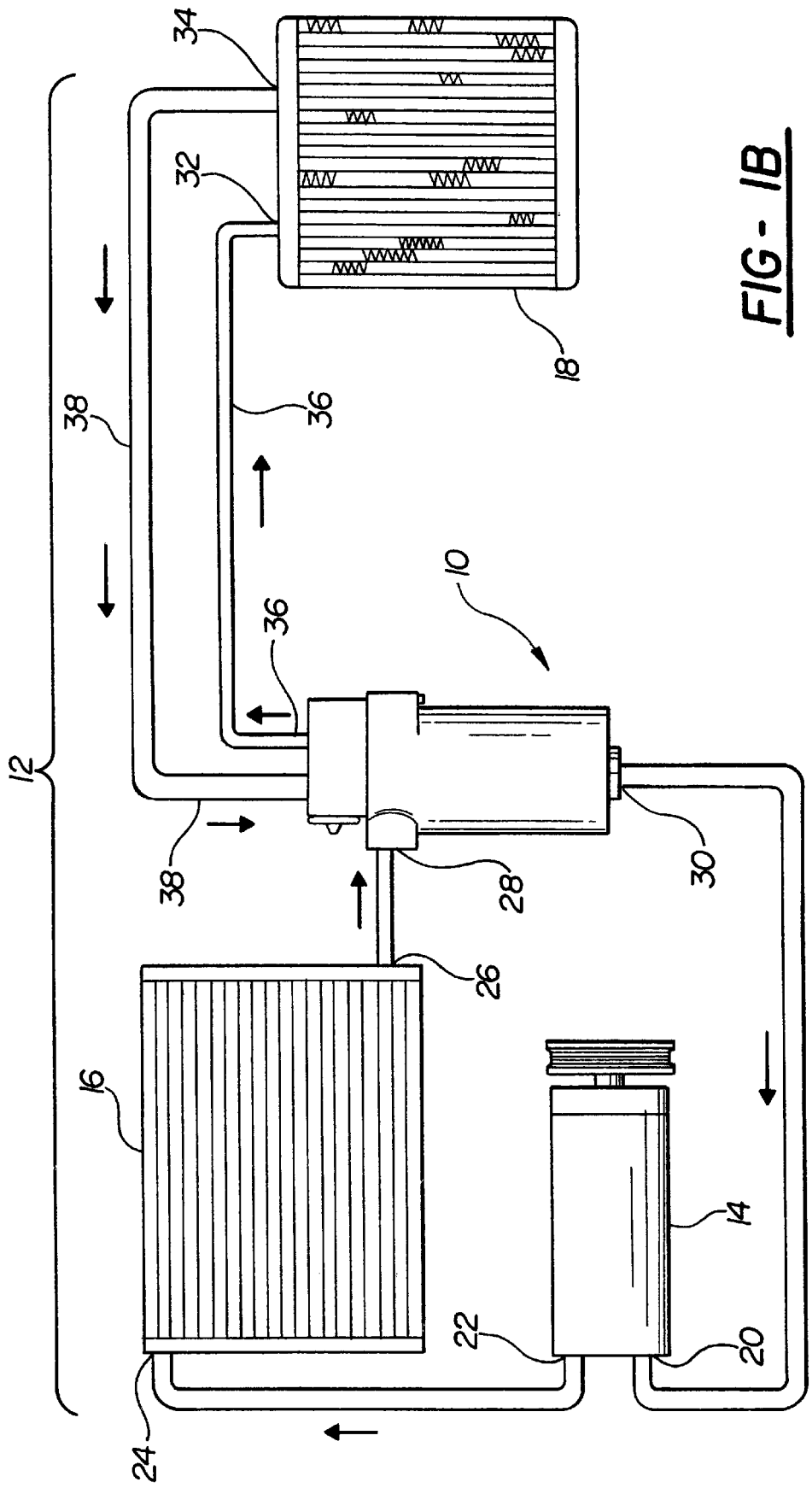
FIG. 1B is a schematic view of an air conditioning system illustrating a refrigerant compressor, a condenser, a multi-function receiver, an evaporator, and first and second refrigerant tubes extending between the multi-function receiver and the evaporator that are not concentric.

Referring specifically to FIGS. 1A and 1B, the receiver 10 is used in an air conditioning system, which is generally indicated at 12. The air conditioning system 12 includes a refrigerant compressor 14, a condenser 16, the receiver 10, and an evaporator 18. The compressor 14 has a compressor inlet 20 and a compressor outlet 22, the condenser 16 has a condenser inlet 24 and a condenser outlet 26, the receiver 10 has a receiver inlet 28 and a receiver outlet 30, and the evaporator 18 has an evaporator inlet 32 and an evaporator outlet 34.

The condenser 16 is in fluid communication with the compressor outlet 22. More specifically, the condenser inlet 24 is in fluid communication with the compressor outlet 22. The compressor 14 pumps the refrigerant to the condenser 16 where a phase of the refrigerant changes from a vapor to a liquid due to the removal of heat by the condenser 16. The refrigerant then flows into the receiver 10 where it is stored for flow into the evaporator 18. As disclosed in FIGS. 1A and 1B, in one sense the receiver 10 is disposed in the flow between the condenser 16 and the evaporator 18, and in another sense the receiver 10 is disposed in the flow between the evaporator 18 and the compressor 14. The evaporator 18 is in fluid communication with the condenser outlet 26, through the receiver 10, and in fluid communication with the compressor inlet 20, through the receiver 10. The refrigerant flows from the receiver 10 into the evaporator 18 where it functions to cool air that is to be directed into a passenger compartment of a vehicle. The phase of the refrigerant changes to a vapor and returns to the compressor inlet 20 via the receiver 10. That is, in the subject invention, the vaporized refrigerant is re-routed through the receiver 10 as described below. Although the evaporator 18 is not in direct fluid communication with the compressor inlet 20, it is to be understood that the evaporator 18 is in fluid communication with the compressor inlet 20 through the receiver 10.

The air conditioning system 12 also includes first and second refrigerant tubes 36, 38. As described additionally below, in FIG. 1A, the first and second refrigerant tubes 36, 38 are concentric relative to each other, and in FIG. 1B, the first and second refrigerant tubes 36, 38 are not concentric relative to each other. In the art, the first refrigerant tube 36 is commonly referred to as the low pressure liquid refrigerant line and the second refrigerant tube 38 is commonly referred to as the suction line. The first and second refrigerant tubes 36, 38 extend between the receiver 10 and the evaporator 18 and are described below.

The receiver 10 of the present invention, and therefore the air conditioning system 12 which includes the receiver 10, attenuate pressure fluctuations of refrigerant flowing from the evaporator 18 to the refrigerant compressor 14. As a result, any noise, e.g. tone, that is associated with the pressure fluctuations of the refrigerant is minimized, if not entirely eliminated. The pressure fluctuations of the refrigerant are also referred to in the art as pulsations. For the purposes of the subject invention, use of the terminology "in fluid communication with" is not intended to require direct connection between any two components of the air conditioning system 12.

Figure 3:
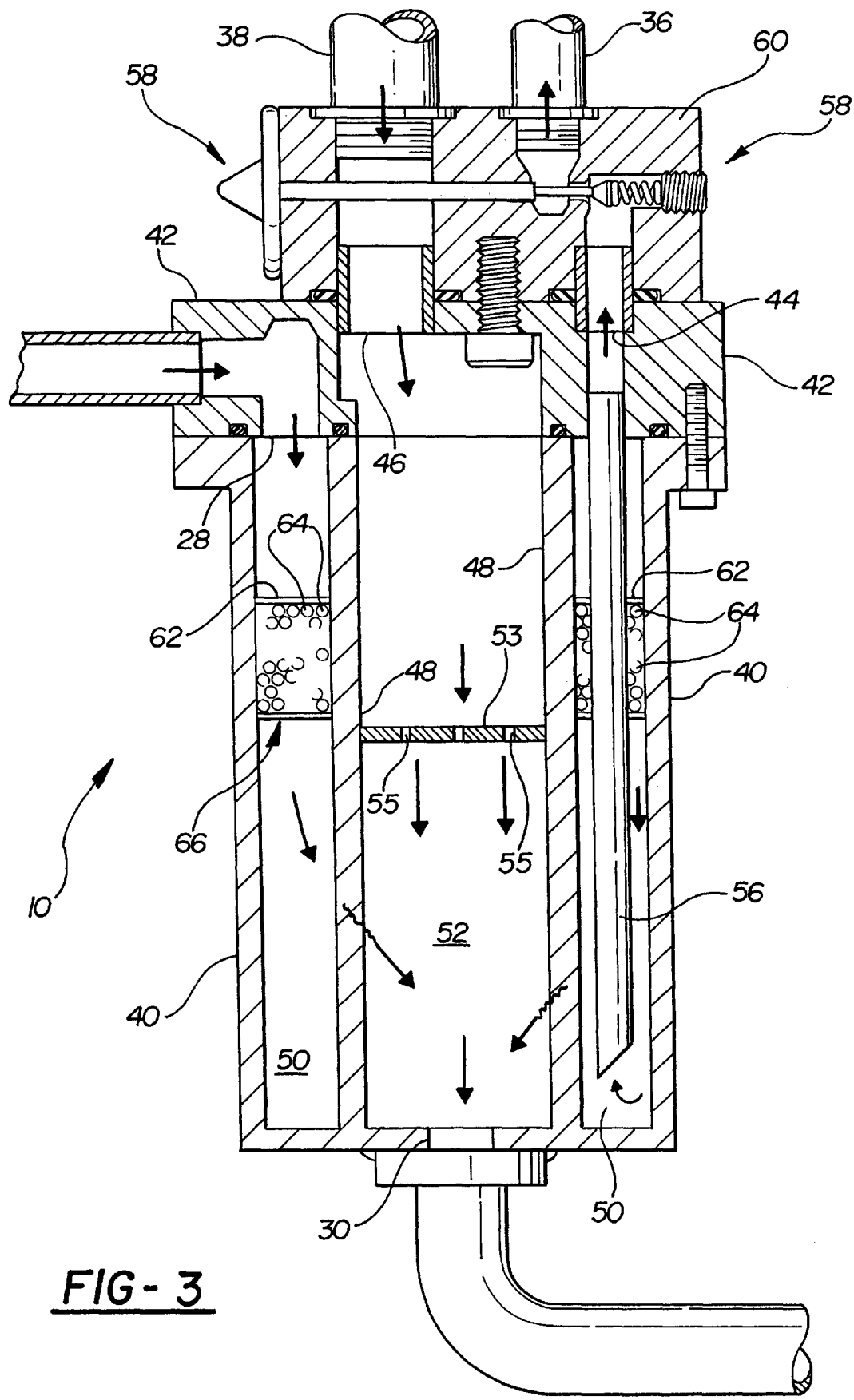
FIG. 3 is a partially cross-sectional side view of the multi-function receiver illustrated in FIG. 1B having non-concentric first and second refrigerant ports and a block-type TXV.

Referring now to FIGS. 2 and 3, the receiver 10 comprises a body housing 40 and a cap housing 42 covering the body housing 40. The receiver 10 is oriented vertically throughout the Figures such that the cap housing 42 is disclosed on top of the body housing 40. However, although it is not preferred, the receiver 10 may be otherwise oriented such that the cap housing 42 is not on top of the body housing 40 yet still covers the body housing 40. For instance, the body housing 40 may be oriented horizontally and the cap housing 42 could cover the body housing 40 on a right or left side of the body housing 40. The body housing 40 comprises the receiver inlet 28 and the receiver outlet 30. The receiver inlet 28 receives the refrigerant from the condenser 16, and the receiver outlet 30 sends the refrigerant to the compressor 14.

First and second refrigerant ports 44, 46 are defined within the cap housing 42. The first refrigerant port 44 is in fluid communication with the evaporator 18 for sending the refrigerant to the evaporator 18, and the second refrigerant port 46 is in fluid communication with the evaporator 18 for receiving the refrigerant from the evaporator 18. In the particular embodiment disclosed in FIG. 2, the first and second refrigerant ports 44, 46 are defined concentrically within the cap housing 42. More specifically, the second refrigerant port 46 is defined concentrically about, or outside, the first refrigerant port 44. Alternatively, in the particular embodiment disclosed in FIG. 3, the first and second refrigerant ports 44, 46 are not concentric. Instead, the first and second refrigerant ports 44, 46 are defined adjacent, or side-by side, each other within the cap housing 42.

The receiver 10 further comprises an internal wall 48. The internal wall 48 defines an outer cavity 50 and an inner cavity 52. More specifically, the internal wall 48 extends between the cap housing 42 and the receiver 10 outlet of the body housing 40 to define the inner and outer cavities 52, 50. The outer cavity 50 is in fluid communication with both the receiver inlet 28 and the first refrigerant port 44. As such, the outer cavity 50 receives the refrigerant from the condenser 16 through the receiver inlet 28 and sends the refrigerant to the evaporator 18 through the first refrigerant port 44.

In the most preferred embodiment of the subject invention, the internal wall 48 is annular within the body housing 40. As such, in this embodiment the outer cavity 50 is further defined as an outer annular cavity 50 and the inner cavity 52 is further defined as an inner annular cavity 52. For descriptive purposes only, the inner and outer cavities 52, 50 are hereinafter referred to as the inner and outer annular cavities 52, 50, respectively.

The inner annular cavity 52 is in fluid communication with both the second refrigerant port 46 and the receiver outlet 30. As such, the inner annular cavity 52 receives the refrigerant from the evaporator 18 to attenuate the pressure fluctuations of the refrigerant received from the evaporator 18. The inner annular cavity 52 essentially functions as a suction gas muffler integrated in the receiver 10. Therefore, a separate suction gas muffler is not required in the air conditioning system 12 of the subject invention. Because the refrigerant is re-routed back through the inner annular cavity 52, the inner annular cavity 52 also functions to sub-cool the refrigerant in the outer annular cavity 50 by simple heat transfer. The refrigerant returning from the evaporator 18 into the inner annular cavity 52 is a vapor having a temperature generally ranging from 35 to 40° F. This vaporized refrigerant removes heat from the liquid refrigerant in the outer annular cavity 50 which has a temperature generally ranging from 125 to 140° F. Also, because the inner annular cavity 52 is in fluid communication with the receiver outlet 30, the refrigerant is sent to the compressor 14 through the receiver outlet 30 after the pressure fluctuations have been attenuated.

To appropriately attenuate the pressure fluctuations, the inner annular cavity 52 is essentially an attenuation chamber that provides a volume that is sufficient to muffle, dampen, and/or suppress the pressure fluctuations. The attenuation chamber is shown, but not numbered, in the Figures. It is to be understood that the volume may be strategically modified to improve the attenuation capabilities of the inner annular cavity 52. For instance, an overall length, cross-section, or diameter of the inner annular cavity 52 may be modified to improve the attenuation capabilities.

Alternatively, a plurality of attenuation chambers may be utilized to improve the attenuation capabilities of the inner annular cavity 52. In such a case, the receiver 10 further comprises at least one baffle 53. The baffle 53 is disposed in the inner annular cavity 52 to define the plurality of attenuation chambers. In FIGS. 2 and 3, the plurality of attenuation chambers are defined below and above the baffle 53. Furthermore, although FIGS. 2 and 3 disclose a single baffle 53, the subject invention may include a plurality of baffles 53 to establish more than two attenuation chambers. For instance, if there are two baffles 53 disposed in the inner annular cavity 52, then three attenuation chambers will be defined. The attenuation chambers may be identically tuned, i.e., engineered, or may be differently tuned for attenuating the pressure fluctuations of the refrigerant flowing from the evaporator 18 to the refrigerant compressor 14. The baffle 53 may be of any shape that is suitable to define the plurality of attenuation chambers within the inner cavity 52. Obviously, in the embodiments where the inner cavity 52 is the inner annular cavity 52, it is preferred that the baffle 53, or baffles 53 if plural, are also annular such that they are washer or ring-like inserts into the inner annular cavity 52.

As an example, if there is a single baffle 53 disposed in the inner annular cavity 52, then this single baffle 53 defines first and second attenuation chambers within the inner cavity. For the refrigerant to flow from one attenuation chamber to another, it is preferred that the receiver 10 further comprises at least one fluid hole 55 defined in the baffle 53. Of course, it is possible that there is a plurality of fluid holes 55 defined in the baffle 53. As such, the refrigerant flows from the evaporator 18, through the second refrigerant port 46, into the first attenuation chamber, through the fluid hole 55 or holes 55 in the baffle 53, into the second attenuation chamber, and to the receiver outlet 30 for sending to the compressor 14.

Although a TXV is not required, the particular embodiment disclosed in FIG. 2 includes a TXV 54 disposed in the cap housing 42 of the receiver 10. The TXV 54 is in fluid communication with the outer annular cavity 50 and with the first refrigerant port 44 for controlling the refrigerant to be sent to the evaporator 18 from the outer annular cavity 50 through the TXV 54 and the first refrigerant port 44. As is understood by those skilled in the art, the TXV 54 controls the flow of the refrigerant into the evaporator 18 by sensing or monitoring a superheat of the refrigerant that exits the evaporator 18 in the second refrigerant tube 38, i.e., the suction line. Because the refrigerant from the evaporator 18 is returned back through the receiver 10, the TXV 54 can sense or monitor the superheat directly in the inner cavity 52 of the receiver 10 and an external superheat sensing bulb is not required in the system 12 to sense the superheat elsewhere. Preferably, a pick-up tube 56 extends between the TXV 54 and the outer annular cavity 50 to accommodate the flow of the refrigerant from the outer annular cavity 50 to the TXV 54. Although not required, if, as in this embodiment, the TXV 54 is actually disposed in the cap housing 42, then it is preferred that the TXV 54 is a cartridge-type TXV 54.

The particular embodiment disclosed in FIG. 3 includes a TXV 58 disposed adjacent the cap housing 42 of the receiver 10. The TXV 58 is in fluid communication with the outer annular cavity 50 and with the first refrigerant port 44 for controlling the refrigerant to be sent to the evaporator 18 from the outer annular cavity 50 through the TXV 58 and the first refrigerant port 44. As with the embodiment disclosed in FIG. 2, this embodiment also includes a pick-up tube 56 that extends between the TXV 58 and the outer annular cavity 50 to accommodate the flow of the refrigerant from the outer annular cavity 50 to the TXV 58. Although not required, if, as in this embodiment, the TXV 58 is actually disposed adjacent the cap housing 42, then it is preferred that the TXV 58 is a block-type TXV 58 such that an additional block component 60 is included that is mounted to the cap housing 42.

The receiver 10 may further comprise a filter 62. The filter 62 is disposed in the outer cavity 50 for filtering debris from the refrigerant. The filter 62 is represented schematically in the Figures. The receiver 10 may also further comprise a desiccant 64 for dehydrating the refrigerant. The desiccant 64 is also disposed in the outer cavity 50. If the outer cavity 50 is annular, then it is preferred that the filter 62 is an annular filter cartridge disposed in the outer annular cavity 50 and that the desiccant is an annular desiccant cartridge disposed in the outer annular cavity 50. In any embodiment, the filter 62 and the desiccant 64 may be separate. However, it is preferred that the filter 62 and desiccant 64 are combined into a single, filter/desiccant cartridge 66. Such cartridges are known in the art.

As initially set forth above, the receiver 10 preferably functions in combination with first and second refrigerant tubes 36, 38 of the air conditioning system 12. The first refrigerant tube 36 is connected with the first refrigerant port 44 and with the evaporator 18 to accommodate the flow of the refrigerant from the receiver 10 to the evaporator 18. More specifically, the first refrigerant tube 36 accommodates the flow of the refrigerant from the outer annular cavity 50 through the first refrigerant port 44 and to the evaporator 18. The second refrigerant tube 38 is connected with the second refrigerant port 46 and with the evaporator 18 to accommodate the flow of the refrigerant from the evaporator 18 to the receiver 10. More specifically, the second refrigerant tube 38 accommodates the flow of the refrigerant from the evaporator 18 through the second refrigerant port 46 and to the inner annular cavity 50.

As the embodiment disclosed in FIGS. 1B and 3 makes clear, it is not required, for the purposes of the subject invention, that the first and second refrigerant tubes 36, 38 be concentric relative to each other. However, in the embodiment disclosed in FIGS. 1A and 2 where the first and second refrigerant ports 44, 46 are defined concentrically within the cap housing 42, the first and second refrigerant tubes 36, 38, which are respectively connected with the first and second refrigerant ports 44, 46, are concentric relative to each other. As such, because the second refrigerant port 46 is most preferably defined concentrically about, or outside, the first refrigerant port 44, the second refrigerant tube 38 is disposed concentrically about, or outside, the first refrigerant tube 36. In other words, the first refrigerant tube 36 is primarily disposed within the second refrigerant tube 38. In this embodiment, a diameter of the first refrigerant tube 36 is less than the diameter of the second refrigerant tube 38. The concentric relationship between the first and second refrigerant tubes 36, 38, as well as the preferred relationship between the respective diameters of the first and second refrigerant tubes 36, 38, are best disclosed in FIG. 4.

Together, the first and second refrigerant tubes 36, 38 establish a concentric tubing apparatus 68. The concentric tubing apparatus 68 is best disclosed in FIGS. 2 and 4. The concentric tubing apparatus is described below and also in commonly-assigned United States patent application entitled "Air Conditioning System and Tubing Apparatus to Prevent Heat Gain due to Engine Compartment Heat" which was filed on the same day as the subject application, the disclosure of which is herein incorporated by reference in its entirety.

The concentric tubing apparatus 68 eliminates independent tubes connected between the receiver 10 and the evaporator 18. As such, a total number of seals required to appropriately seal the tubes within the air conditioning system 12 is minimized thereby minimizing the likelihood of leaks and seal permeation resulting in decreased system 12 performance.

Figure 4:
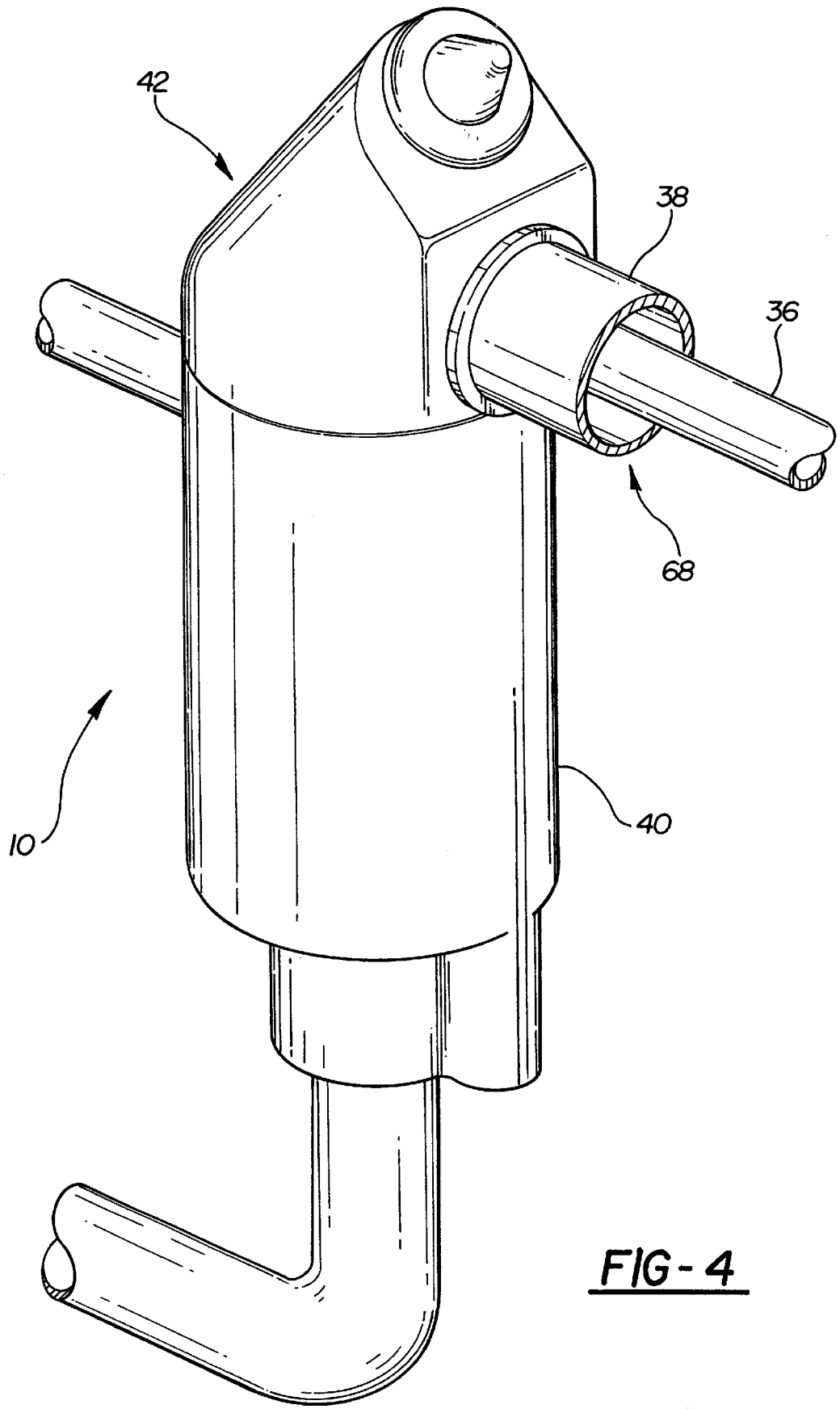
FIG. 4 is a perspective view of the multi-function receiver illustrated in FIGS. 1A and 2 illustrating the concentric tubing apparatus.

In the embodiment disclosed in FIGS. 1A, 2, and 4, the first and second refrigerant tubes 36, 38 are not independent. Instead these tubes 36, 38 are co-dependent with the first refrigerant tube 36 within the second refrigerant tube 38, and with the second refrigerant tube 38 insulating the first refrigerant tube 36. The concentric tubing apparatus 68 enables the air conditioning system 12 to prevent heat gain in the refrigerant due to heat generated in an engine compartment of the vehicle. More specifically, the concentric tubing apparatus 68 insulates the refrigerant from this heat. That is, the second refrigerant tube 38 is disposed concentrically about, or outside, the first refrigerant tube 36 to insulate the first refrigerant tube 36, and the refrigerant flowing in the first refrigerant tube 36 to the evaporator 18, from the heat generated in the engine compartment. Thus, heat gain in the refrigerant flowing in the first refrigerant tube 36 to the evaporator 18 is prevented. Furthermore, insulation of the refrigerant in the first refrigerant tube 36 from the heat, leaves more enthalpy potential for the refrigerant to absorb heat in the evaporator 18.

It is to be understood that, although not disclosed, the particular embodiment of the subject invention represented in FIGS. 1B and 3, where the first and second refrigerant ports 44, 46 are defined non-concentrically within the cap housing 42, could still incorporate the concentric tubing apparatus 68. In such a case, the concentric tubing apparatus 68 would be slightly modified such that the first and second refrigerant tubes 36, 38 would split out from their concentric relationship at or near the first and second refrigerant ports 44, 46 such that each tube 36, 38 could be individually and separately connected to the receiver 10. The same would be true at the evaporator 18 side also. In other words, because the first and second refrigerant ports 44, 46 are non-concentric in FIGS. 1B and 3, the first and second refrigerant tubes 36, 38 could become concentric relative to each other after their separate connection to the first and second refrigerant ports 44, 46.

The receiver 10 of the subject invention is multi-functional in the sense that it functions as a reservoir for the refrigerant, a filter 62, a desiccant 64, a suction gas muffler, and a sub-cooler for the refrigerant in the outer annular cavity 50.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A multi-function receiver for use in an air conditioning system including a refrigerant compressor, a condenser in fluid communication with an outlet of the refrigerant compressor, and an evaporator in fluid communication with an outlet of the condenser and with an inlet of the refrigerant compressor, wherein said multi-function receiver attenuates pressure fluctuations of refrigerant flowing from the evaporator to the refrigerant compressor and comprises:

a body housing comprising a receiver inlet for receiving the refrigerant from the condenser and a receiver outlet for sending the refrigerant to the refrigerant compressor;

a cap housing covering said body housing;

a first refrigerant port defined within said cap housing and adapted to be in fluid communication with the evaporator for sending the refrigerant to the evaporator;

a second refrigerant port defined within said cap housing and adapted to be in fluid communication with the evaporator for receiving the refrigerant from the evaporator; and an internal wall defining an outer cavity and an inner cavity, wherein said outer cavity is in fluid communication with said receiver inlet for receiving the refrigerant from the condenser and with said first refrigerant port for sending the refrigerant to the evaporator, and said inner cavity is in fluid communication with said second refrigerant port for receiving the refrigerant from the evaporator to attenuate the pressure fluctuations of the refrigerant received from the evaporator and with said receiver outlet for sending the refrigerant to the compressor after the pressure fluctuations have been attenuated.

2. A multi-function receiver as set forth in claim 1 further comprising a thermostatic expansion valve disposed in said cap housing and in fluid communication with said outer cavity and with said first refrigerant port for controlling the refrigerant to be sent to the evaporator from said outer cavity.

3. A multi-function receiver as set forth in claim 2 further comprising a pick-up tube extending between said thermostatic expansion valve and said outer cavity for accommodating the flow of the refrigerant from said outer cavity to said thermostatic expansion valve.

4. A multi-function receiver as set forth in claim 2 wherein said thermostatic expansion valve is further defined as a cartridge-type thermostatic expansion valve.

5. A multi-function receiver as set forth in claim 1 further comprising a thermostatic expansion valve disposed adjacent said cap housing and in fluid communication with said outer cavity and with said first refrigerant port for controlling the refrigerant to be sent to the evaporator from said outer cavity.

6. A multi-function receiver as set forth in claim 5 further comprising a pick-up tube extending between said thermostatic expansion valve and said outer cavity for accommodating the flow of the refrigerant from said outer cavity to said thermostatic expansion valve.

7. A multi-function receiver as set forth in claim 5 wherein said thermostatic expansion valve is further defined as a block-type thermostatic expansion valve.

8. A multi-function receiver as set forth in claim 1 further comprising a filter disposed in said outer cavity for filtering debris from the refrigerant.

9. A multi-function receiver as set forth in claim 1 further comprising a desiccant disposed in said outer cavity for dehydrating the refrigerant.

10. A multi-function receiver as set forth in claim 1 wherein said first and second refrigerant ports are defined concentrically within said cap housing.

11. A multi-function receiver as set forth in claim 10 wherein said second refrigerant port is defined concentrically about said first refrigerant port.

12. A multi-function receiver as set forth in claim 1 further comprising at least one baffle disposed in said inner cavity to define a plurality of attenuation chambers with said inner cavity for attenuating the pressure fluctuations of the refrigerant flowing from the evaporator to the refrigerant compressor.

13. A multi-function receiver as set forth in claim 1 further comprising a baffle disposed in said inner cavity to define first and second attenuation chambers within said inner cavity for attenuating the pressure fluctuations of the refrigerant flowing from the evaporator to the refrigerant compressor.

14. A multi-function receiver as set forth in claim 13 further comprising at least one fluid hole defined in said baffle such that the refrigerant from the evaporator flows into said first attenuation chamber through said fluid hole into said second attenuation chamber and to said receiver outlet for sending to the refrigerant compressor.

15. A multi-function receiver as set forth in claim 1 in combination with a first refrigerant tube connected with said first refrigerant port for accommodating the flow of the refrigerant from said multi-function receiver to the evaporator, and a second refrigerant tube connected with said second refrigerant port for accommodating the flow of the refrigerant from the evaporator to said multi-function receiver.

16. A multi-function receiver as set forth in claim 15 wherein said first and second refrigerant ports are defined concentrically within said cap housing such that said first and second refrigerant tubes, which are respectively connected with said first and second refrigerant ports, are concentric relative to each other.

17. A multi-function receiver as set forth in claim 16 wherein said second refrigerant port is defined concentrically about said first refrigerant port such that said second refrigerant tube is disposed concentrically about said first refrigerant tube.

18. A multi-function receiver as set forth in claim 1 wherein said internal wall extends between said cap housing and said receiver outlet of said body housing to define said outer and inner cavities.

19. A multi-function receiver as set forth in claim 1 wherein said internal wall is annular within said body housing such that said outer cavity is further defined as an outer annular cavity and said inner cavity is further defined as an inner annular cavity.

20. A multi-function receiver as set forth in claim 19 further comprising an annular filter cartridge disposed in said outer annular cavity for filtering debris from the refrigerant.

21. A multi-function receiver as set forth in claim 19 further comprising an annular desiccant cartridge disposed in said outer annular cavity for dehydrating the refrigerant.

22. A multi-function receiver for use in an air conditioning system including a refrigerant compressor, a condenser in fluid communication with an outlet of the refrigerant compressor, and an evaporator in fluid communication with an outlet of the condenser and with an inlet of the refrigerant compressor, wherein said multi-function receiver attenuates pressure fluctuations of the refrigerant flowing from the evaporator to the refrigerant compressor and comprises:

a body housing comprising a receiver inlet for receiving the refrigerant from the condenser and a receiver outlet for sending the refrigerant to the refrigerant compressor;

a cap housing covering said body housing;

a first refrigerant port defined within said cap housing and adapted to be in fluid communication with the evaporator for sending the refrigerant to the evaporator;

a second refrigerant port defined within said cap housing and adapted to be in fluid communication with the evaporator for receiving the refrigerant from the evaporator;

a thermostatic expansion valve fluid communication with said first refrigerant port for controlling the refrigerant to be sent to the evaporator through said first refrigerant port; and an internal wall defining an outer cavity and an inner cavity, wherein
said outer cavity is in fluid communication with said receiver inlet for receiving the refrigerant from the condenser and with said thermostatic expansion valve for sending the refrigerant to the evaporator through said thermostatic expansion valve and said first refrigerant port, and
said inner cavity is in fluid communication with said second refrigerant port for receiving the refrigerant from the evaporator to attenuate the pressure fluctuations of the refrigerant received from the evaporator and with said receiver outlet for sending the refrigerant to the compressor after the pressure fluctuations have been attenuated.

23. A multi-function receiver as set forth in claim 22 wherein said thermostatic expansion valve is disposed in said cap housing.

24. A multi-function receiver as set forth in claim 23 further comprising a pick-up tube extending between said thermostatic expansion valve and said outer cavity for accommodating the flow of the refrigerant from said outer cavity to said thermostatic expansion valve.

25. A multi-function receiver as set forth in claim 23 wherein said thermostatic expansion valve is further defined as a cartridge-type thermostatic expansion valve.

26. A multi-function receiver as set forth in claim 22 wherein said thermostatic expansion valve is disposed adjacent said cap housing.

27. A multi-function receiver as set forth in claim 26 further comprising a pick-up tube extending between said thermostatic expansion valve and said outer cavity for accommodating the flow of the refrigerant from said outer cavity to said thermostatic expansion valve.

28. A multi-function receiver as set forth in claim 26 wherein said thermostatic expansion valve is further defined as a block-type thermostatic expansion valve.

29. A multi-function receiver as set forth in claim 22 wherein said first and second refrigerant ports are defined concentrically within said cap housing.

30. A multi-function receiver as set forth in claim 29 wherein said second refrigerant port is defined concentrically about said first refrigerant port.

31. A multi-function receiver as set forth in claim 22 in combination with a first refrigerant tube connected with said first refrigerant port for accommodating the flow of the refrigerant from said multi-function receiver to the evaporator, and a second refrigerant tube connected with said second refrigerant port for accommodating the flow of the refrigerant from the evaporator to said multi-function receiver.

32. A multi-function receiver as set forth in claim 31 wherein said first and second refrigerant ports are defined concentrically within said cap housing such that said first and second refrigerant tubes, which are respectively connected with said first and second refrigerant ports, are concentric relative to each other.

33. A multi-function receiver as set forth in claim 32 wherein said second refrigerant port is defined concentrically about said first refrigerant port such that said second refrigerant tube is disposed concentrically about said first refrigerant tube.

34. A multi-function receiver as set forth in claim 22 wherein said internal wall extends between said cap housing and said receiver outlet of said body housing to define said outer and inner cavities.

35. A multi-functional receiver as set forth in claim 22 wherein said internal wall is annular within said body housing such that said outer cavity is further defined as an outer annular cavity and said inner cavity is further defined as an inner annular cavity.

36. An air conditioning system for attenuating pressure fluctuations of a refrigerant, said air conditioning system comprising:
   a refrigerant compressor;
   a condenser in fluid communication with an outlet of said refrigerant compressor;
   an evaporator in fluid communication with an outlet of said condenser and with an inlet of said refrigerant compressor;
   a body housing disposed between said condenser and said evaporator, said body housing comprising a receiver inlet for receiving the refrigerant from said condenser and a receiver outlet for sending the refrigerant to said refrigerant compressor;
   a cap housing covering said body housing;
   a first refrigerant port defined within said cap housing and in fluid communication with said evaporator for sending the refrigerant received from said condenser to said evaporator;
   a second refrigerant port defined within said cap housing and in fluid communication with said evaporator for receiving the refrigerant from said evaporator;
   an internal wall defining an outer cavity and an inner cavity, wherein
      said outer cavity is in fluid communication with said receiver inlet for receiving the refrigerant from said condenser and with said first refrigerant port for sending the refrigerant to said evaporator, and
      said inner cavity is in fluid communication with said second refrigerant port for receiving the refrigerant from said evaporator to attenuate the pressure fluctuations of the refrigerant received from said evaporator and with said receiver outlet for sending the refrigerant to said refrigerant compressor after the pressure fluctuations have been attenuated.

37. An air conditioning system as set forth in claim 36 further comprising a first refrigerant tube connected with said first refrigerant port for accommodating the flow of the refrigerant from said outer cavity through said first refrigerant port and to said evaporator, and a second refrigerant tube connected with said second refrigerant port for accommodating the flow of the refrigerant from said evaporator through said second refrigerant port and to said inner cavity.

38. An air conditioning system as set forth in claim 37 wherein said first and second refrigerant ports are defined concentrically within said cap housing such that said first and second refrigerant tubes, which are respectively connected with said first and second refrigerant ports, are concentric relative to each other.

39. An air conditioning system as set forth in claim 38 wherein said second refrigerant port is defined concentrically about said first refrigerant port such that said second refrigerant tube is disposed concentrically about said first refrigerant tube.

40. An air conditioning system as set forth in claim 36 further comprising a thermostatic expansion valve in fluid communication with said outer cavity and with said first refrigerant port for controlling the refrigerant to be sent to said evaporator from said outer cavity.

41. An air conditioning system as set forth in claim 36 wherein said internal wall extends between said cap housing and said receiver outlet of said body housing to define said outer and inner cavities.

42. An air conditioning system as set forth in claim 36 wherein said internal wall is annular within said body housing such that said outer cavity is further defined as an outer annular cavity and said inner cavity is further defined as an inner annular cavity.

43. An air conditioning system as set forth in claim 36 further comprising at least one baffle disposed in said inner cavity to define a plurality of attenuation chambers within said inner cavity for attenuating the pressure fluctuations of the refrigerant flowing from said evaporator to said refrigerant compressor.

* * * * *